Sept. 4, 1956 — R. E. KERR — 2,761,953
REPLACEABLE TIP WELDING ELECTRODES
Filed June 25, 1954
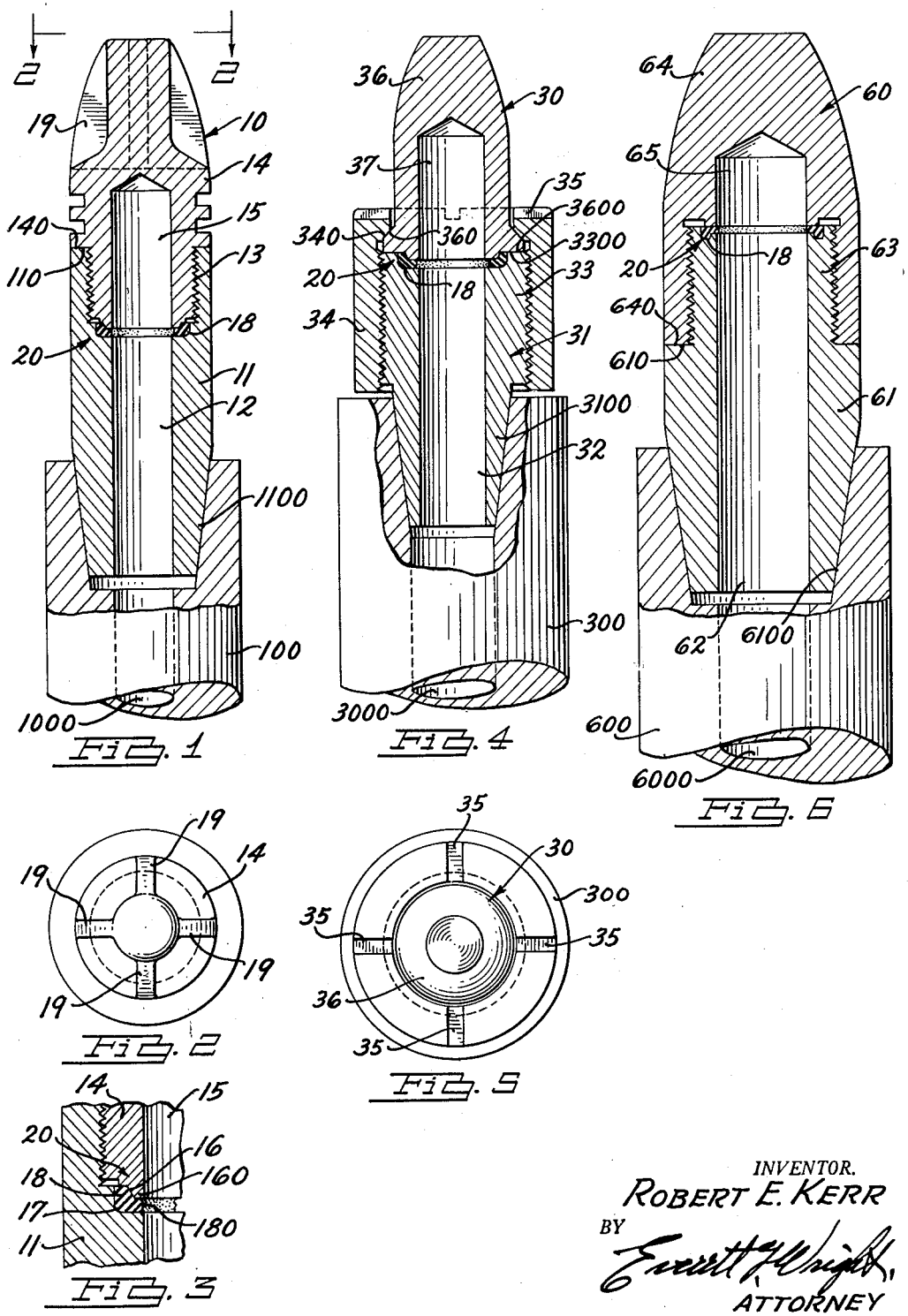
INVENTOR.
ROBERT E. KERR
BY
ATTORNEY United States Patent Office 2,761,953
Patented Sept. 4, 1956

2,761,953

REPLACEABLE TIP WELDING ELECTRODES

Robert E. Kerr, Detroit, Mich.

Application June 25, 1954, Serial No. 439,217

6 Claims. (Cl. 219—120)

This invention relates to improvements in replaceable tip welding electrodes.

For many years it has been customary to employ welding electrodes that must be replaced as soon as the tip or end thereof is burned away. One important reason the use of one-piece electrodes was considered necessary was to avoid leakage of coolant from the joints between electrode tips and the bodies of two-piece electrodes. Gaskets sealing the joints in two-piece electrodes became overheated and deteriorated before the electrode was completely used up causing leakage of coolant from the electrode, and as a result, there was a considerable loss of operating time of welding equipment necessitated by frequent replacement of gaskets.

The use of one-piece electrodes is expensive in the cost of unused copper that must be scrapped when the tip has been burned away. Furthermore, attempts to unduly lengthen the solid tips of one-piece electrodes have caused them to become overheated since an extremly long solid mass of copper at the end of an electrode tends to retain heat from welds performed at rapid intervals.

Accordingly, it is the primary object of this invention to provide an effective and efficient leak-proof two-piece or tipped electrode having positive means for sealing the joint between the body and the tip of the electrode which is directly cooled by the coolant employed to cool the electrode tip, and thereby prevent the said sealing means from overheating and early deterioration.

Other objects of the invention will become apparent by reference to the following detailed description taken in connection with the accompanying drawing, in which:

Fig. 1 is a vertical sectional view through a two-piece finned electrode embodying the invention.

Fig. 2 is an end elevational view of the electrode disclosed in Fig. 1.

Fig. 3 is an enlarged fragmentary sectional view showing the electrode body and tip construction at the fluid seal employed therebetween and the approximate shape taken by the sealing means when the electrode tip is threaded tightly onto the electrode body.

Fig. 4 is a vertical sectional view of another form of electrode embodying the invention which employs a threaded securing sleeve to secure the tip to the body which may also serve as means for pulling the tapered shank of the electrode body from the electrode holder.

Fig. 5 is an end elevational view of the electrode disclosed in Fig. 4.

Fig. 6 is a vertical sectional view of another electrode incorporating the invention, which electrode is similar to the embodiment disclosed in Fig. 1 except that the sealing means is differently located.

Referring now to the drawing wherein like numerals refer to like and corresponding parts throughout the several views, the illustrative embodiment of the improved welding electrode 10 disclosed in Figs. 1–3 inclusive comprises a body 11 having a tapered shank 1100 and a longitudinal bore 12 therethrough, and a threaded counterbore 13 at its outer end to accommodate an externally threaded tip 14 having a longitudinal bore 15 at its inner end which preferably is in alignment with the longitudinal bore 12 through the body 11. The tip 14 is provided with an annular shoulder 140 which abuts the annular end 110 of the body 11. The threading of the tip 14 into the body 11 with opposite annular shoulders 140 and 110 in abutment provides adequate electrical contact between the body 11 and tip 14 but does not generally provide an effective seal for coolant which is circulated in the chamber formed by the bores 12 and 15.

To provide the proper seal, diagonally opposed seats 16 and 17 are formed at the base of the threaded counterbore 13 in the body 11 and at the inner end of the threaded tip 14 as best shown in Fig. 3, which seats 16 and 17 are so spaced and located as to provide an O-ring pocket therebetween opening into the coolant chamber formed by the bores 12 and 15. These seats may be of any suitable shape to engage an O-ring 18 of suitable size and material therebetween when the tip 14 is threaded into the body 11 whereby to provide a fluidtight seal and to expose a portion 180 of the O-ring 18 to coolant circulated in the usual manner through the chamber formed by the bores 12 and 15.

This sealing means generally designated by the numeral 20 throughout the several embodiments of the invention shown in the drawing is such that the rubber, neoprene, plastic or other material of which the O-ring is formed will not deteriorate since the usual elevated temperatures of the electrode are locally reduced at the O-ring by coolant contacting the O-ring 18 and because the relatively thin lip 160 at the seat 16 which is formed to be of considerably lesser mass than the remainder of the electrode.

In the embodiment of the invention shown in Figs. 1–3, the relatively small diameter end of the tip 14 is provided with a plurality of supporting fins 19 which aid in cooling the tip, and at the same time aid in conducting welding current to the end of the tip. This construction is preferable where a relatively small diameter solid ended tip may be used in certain welding operations.

Referring now to the embodiment of the invention shown in Figs. 4 and 5, a three-piece electrode 30 is disclosed which comprises a body 31 having a tapered shank 3100 and a longitudinal bore 32 therethrough, and an exteriorly threaded outer end 33 over which is threaded a sleeve nut 34 having at its outer end outwardly facing wrench slots 35 and an inwardly facing annular beveled seat 340. The said annular beveled seat 340 engages a complementarily beveled annular seat 360 formed at the outer periphery of the inner end of the electrode tip 36 as best shown in Fig. 4. The tip 36 is provided with a central bore 37 which, in cooperation with the bore 32 through the body 31, serves as a chamber through which coolant is circulated to cool the electrode.

The annular end 3300 of the exteriorly threaded end 33 of the body 31 abuts against the inner annular end 3600 of the electrode tip 36, and is held in such abutting relationship by the sleeve nut 34; however, this does not generally provide an adequate seal between the body 31 and the tip 36 to prevent leakage of coolant which is circulated in the chamber formed by the bores 32 and 37. A seal designated by the numeral 20 composed of an O-ring 18 and diagonally opposed seats 16 and 17 as indicated in Fig. 3 is provided between the annular inner end of the electrode tip 36 and the annular outer end of the body 31 and radially inwardly in respect to the abutting annular ends 3300 and 3600 of the outer threaded end 33 of the body 31 and the electrode tip 36 respectively.

The lower annular end of the sleeve nut 34 is of such dimension from the upper annular face of the female tapered electrode holder 300 that, when the tip 36 is removed from the electrode 30, the sleeve nut 34 may be employed as a puller by threading its lower annular end against the said upper annular face of the electrode holder 300 to remove the tapered shank 3100 of the body 31 from the female taper of the electrode holder 300.

Referring now to Fig. 6, the embodiment of the invention disclosed therein is like and similar to the embodiment of the invention shown in Fig. 1 except that the elements thereof have been rearranged. The welding electrode 60 comprises a body 61 having a tapered shank 6100 and a longitudinal bore 62 therethrough and a threaded end 63 at its outer end which is somewhat reduced in diameter to accommodate an internally threaded tip 64 having a bore 65 at its inner end which preferably is in alignment with the longitudinal bore 62 through the body 61. The inner end of the tip 64 forms an annular shoulder 640 which abuts the annular shoulder 610 of the body 61.

The threading of the tip 64 onto the body 61 with the annular end 640 and annular shoulder 610 thereof in abutment does not generally provide an effective seal between the tip 64 and the body 61 for coolant circulated in the chamber formed by the bores 62 and 65. The same seal generally designated by the numeral 20 used in the embodiment of the invention disclosed in Figs. 1–3 inclusive is preferably employed in the embodiment of the invention disclosed in Fig. 6.

In all three embodiments of the invention the welding electrodes 10, 30 and 60 are shown to have the tapered shanks 1100, 3100 and 6100 thereof engaged into complementarily tapered electrode holders 100, 300 and 600 respectively. As indicated, each electrode holder is bored at 1000, 3000 and 6000 through which a small coolant supply tube, not shown, is disposed, which preferably extends well into the electrode tips 14, 36 and 64 respectively to furnish coolant thereinto. The coolant is returned from the tips 14, 36 and 64 through the bores 1000, 3000 and 6000 of the electrode holders 100, 300 and 600 respectively.

Although but several embodiments of the invention have been disclosed and described in detail, it is obvious that many changes may be made in the size, shape, arrangement and detail of the various elements of the invention without departing from the spirit and scope thereof as defined by the appended claims.

I claim:

1. In an electrode, a body portion having a bore therethrough and a replaceable tip having a bore therein communicating with said body bore forming a coolant chamber, said body portion and tip being formed to present oppositely disposed annular faces, means securing said tip and said body portion together with said annular faces thereof in contact with each other, the said body portion and tip being provided with diagonally oppositely disposed annular seats forming an O-ring pocket therebetween adjacent to and opening into said coolant chamber, and an O-ring disposed in said pocket establishing a fluidtight seal between said body portion and said tip when said electrode elements are secured together.

2. In an electrode, a body portion having a bore therethrough forming a coolant chamber, a replaceable tip, said body portion and tip being formed to present oppositely disposed annular faces, means securing said tip and said body portion together with said annular faces thereof in contact with each other, the said body portion and tip being provided with diagonally oppositely disposed annular seats forming an O-ring pocket therebetween adjacent to and opening into said coolant chamber, and an O-ring disposed in said pocket establishing a fluidtight seal between said body portion and said tip when said electrode elements are secured together.

3. In an electrode, a body portion having a bore therethrough and a replaceable tip having a bore therein communicating with said body bore forming a coolant chamber, said body portion and tip being formed to present oppositely disposed annular faces, means securing said tip and said body portion together with said annular faces thereof in contact with each other, the said body portion and tip being provided with diagonally oppositely disposed annular seats forming an O-ring pocket therebetween adjacent to and opening into said coolant chamber, one pocket wall being relatively thin and disposed adjacent said cooling chamber, and an O-ring disposed in said pocket establishing a fluidtight seal between said body portion and said tip when said elements are secured together.

4. An electrode comprising a body portion and a replaceable tip axially threaded together, said body portion having a bore therethrough and said removable tip having a bore therein communicating with said body bore forming a coolant chamber, said body portion and tip being formed to provide oppositely disposed annular contacting faces when secured together, the said body portion and tip also being provided with diagonally oppositely disposed annular seats forming an O-ring pocket therebetween adjacent to and opening into said coolant chamber, and an O-ring disposed in said pocket establishing a fluidtight seal between said body and said tip when said elements are threaded together.

5. An electrode comprising a body portion and a replaceable tip axially disposed in abutment therewith, said body portion having a bore therethrough and said replaceable tip having a bore therein communicating with said body bore forming a coolant chamber, said body portion and tip being formed to present oppositely disposed annular faces, means securing said tip to said body portion with said annular faces thereof in contact with each other, the said body portion and tip being provided with diagonally oppositely disposed annular seats adjacent said contacting annular faces forming an O-ring pocket therebetween and opening into said coolant chamber, and an O-ring in said pocket establishing a fluidtight seal between said body portion and said top when said elements are secured together.

6. An electrode comprising a body portion and a replaceable tip axially disposed in abutment therewith, said body portion having a bore therethrough and said replaceable tip having a bore therein communicating with said body bore forming a coolant chamber, said body portion and tip being formed to present oppositely disposed annular faces which bear against each other when said tip is secured to said body portion, the said body portion and tip being provided with diagonally oppositely disposed annular seats adjacent said contacting annular faces forming an O-ring pocket therebetween and opening into said coolant chamber, an O-ring in said pocket establishing a fluidtight seal between said body portion and said top when said elements are secured together, and a sleeve nut threaded onto said body portion, said sleeve nut and said body portion being formed with complementary internal and external seats engageable responsive to the tightening of the sleeve nut onto said body portion to clamp said tip into sealed axial abutment therewith.

References Cited in the file of this patent

UNITED STATES PATENTS

| | | |
|---|---|---|
| 2,088,936 | Von Henke | Aug. 3, 1937 |
| 2,389,945 | Wisler | Nov. 27, 1945 |
| 2,468,647 | Watter | Apr. 26, 1949 |